Sept. 20, 1966　　　D. B. ROTTLER　　　3,273,423
BORING MACHINE

Filed Dec. 13, 1965　　　　　　　　　　　　　5 Sheets-Sheet 1

DONALD B. ROTTLER
INVENTOR.

BY Seed & Berry

ATTORNEYS

Sept. 20, 1966     D. B. ROTTLER     3,273,423
BORING MACHINE
Filed Dec. 13, 1965     5 Sheets-Sheet 2
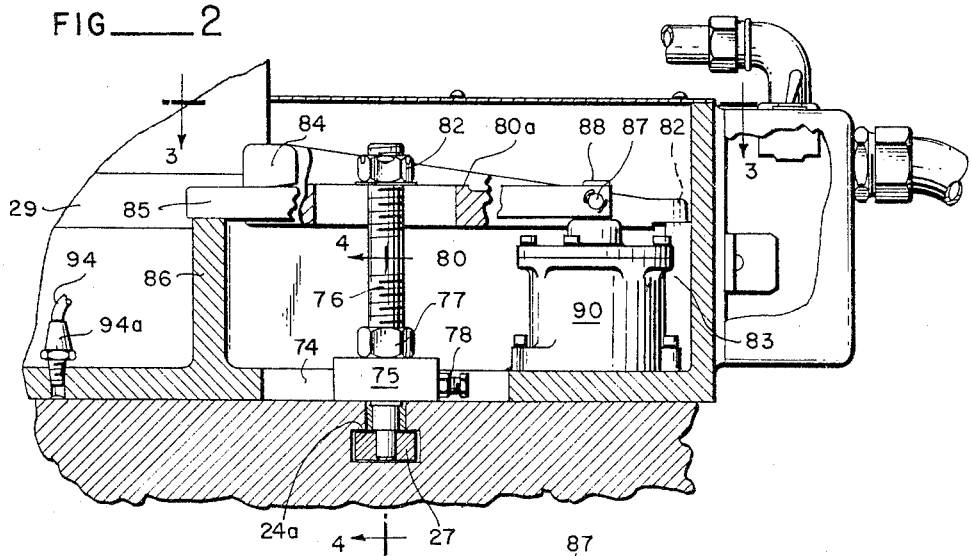
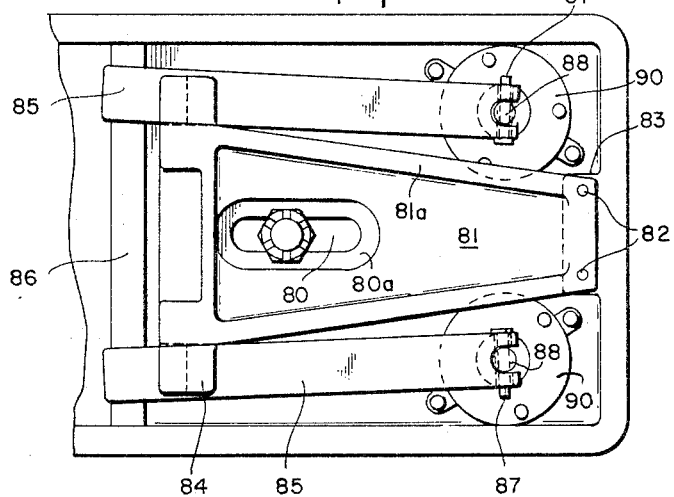
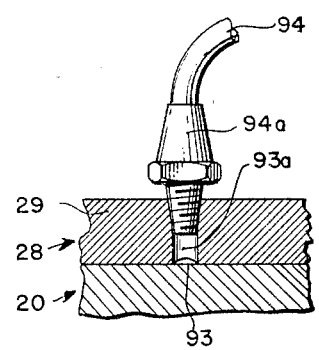
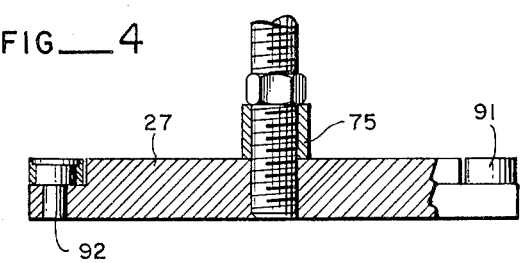
DONALD B. ROTTLER
INVENTOR.
BY Seed & Berry
ATTORNEYS Sept. 20, 1966     D. B. ROTTLER     3,273,423
BORING MACHINE
Filed Dec. 13, 1965     5 Sheets-Sheet 3
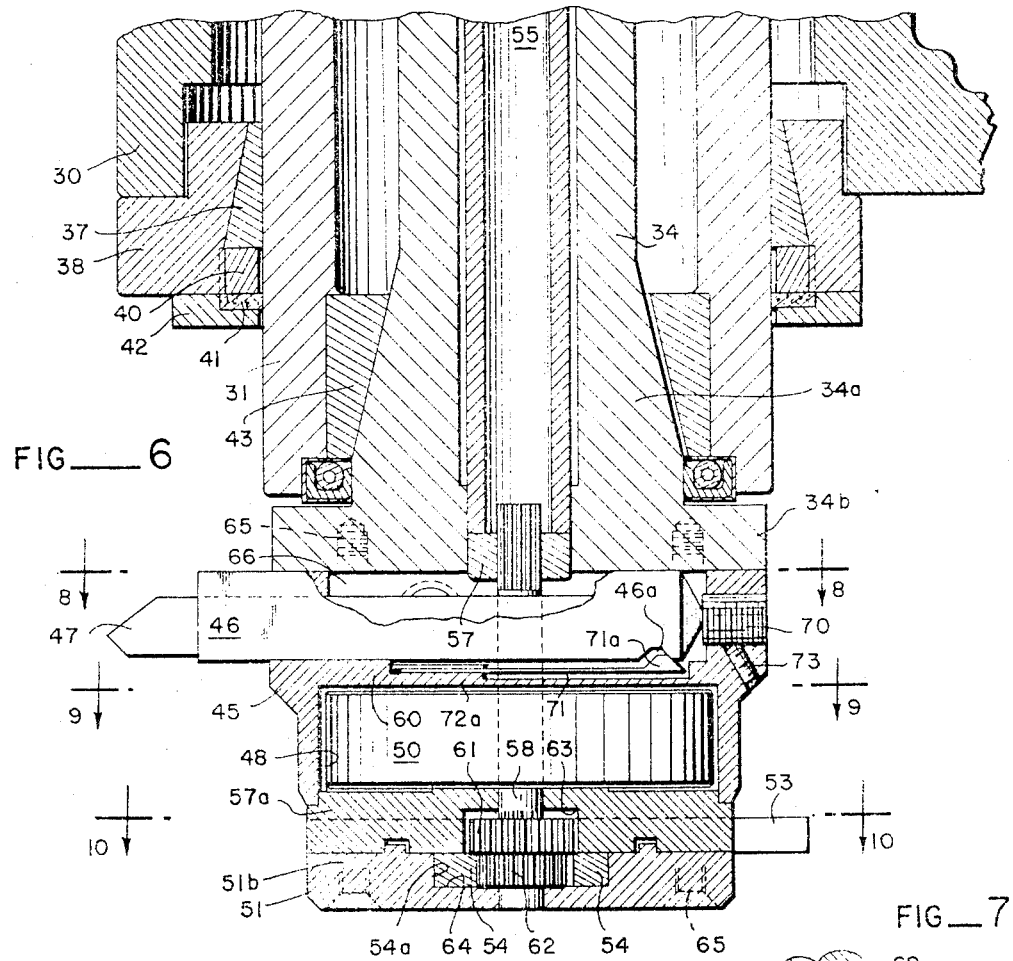
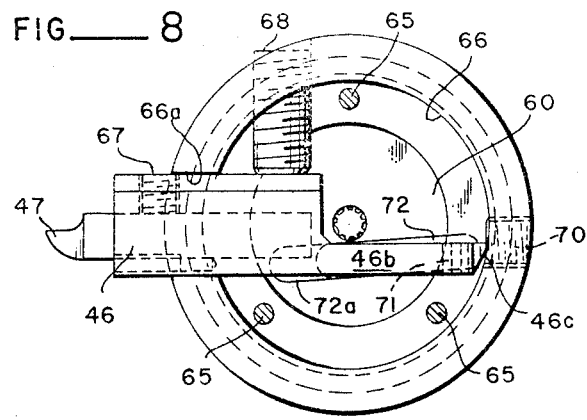
DONALD B. ROTTLER
*INVENTOR.*
BY *Seed & Berry*
ATTORNEYS Sept. 20, 1966  D. B. ROTTLER  3,273,423
BORING MACHINE
Filed Dec. 13, 1965  5 Sheets-Sheet 4
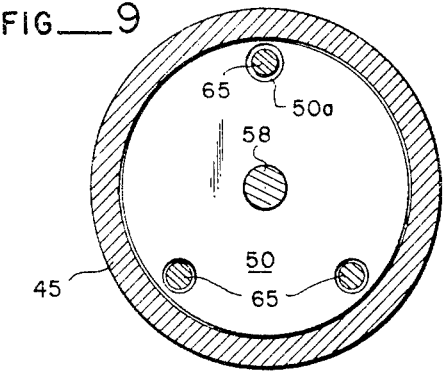
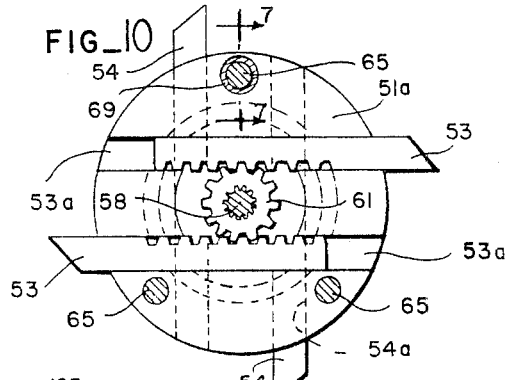
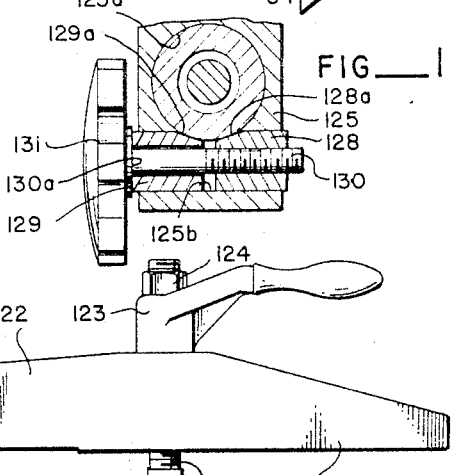
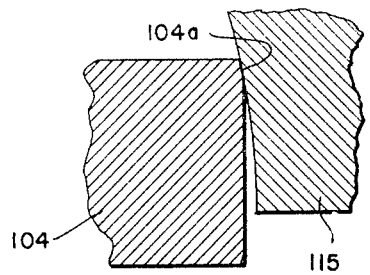
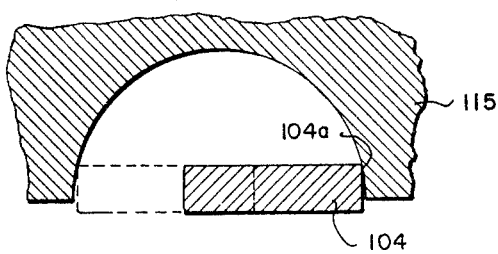
DONALD B. ROTTLER
INVENTOR.
BY Seed & Berry
ATTORNEYS Sept. 20, 1966  D. B. ROTTLER  3,273,423
BORING MACHINE
Filed Dec. 13, 1965  5 Sheets-Sheet 5
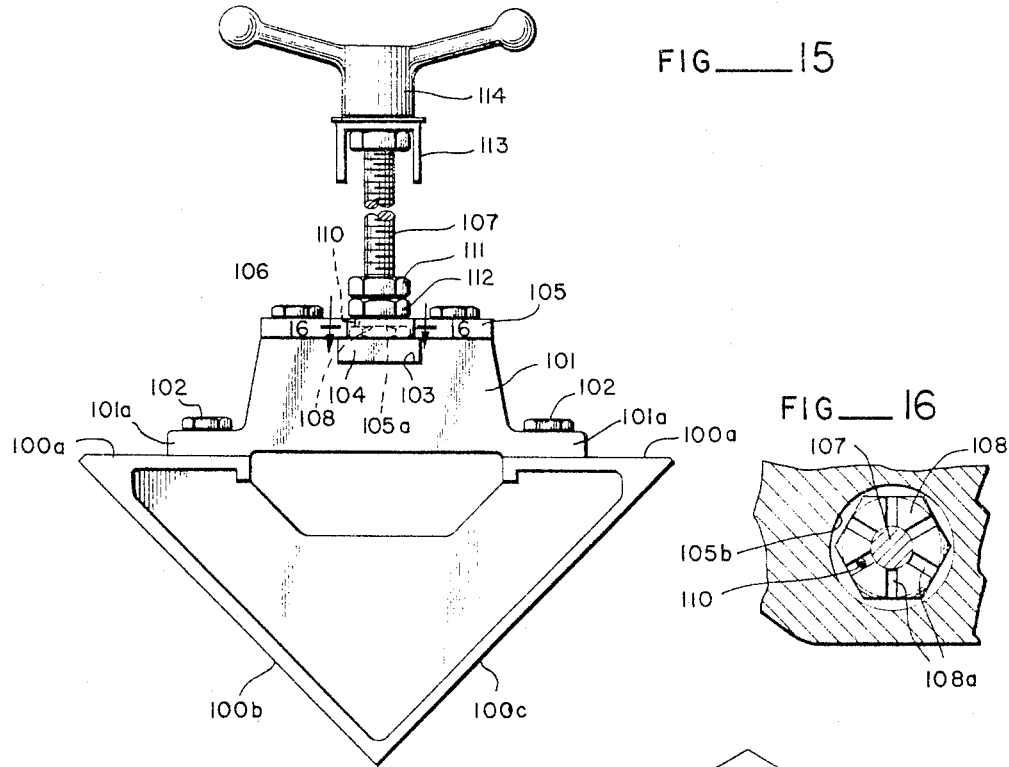
FIG. 15
FIG. 16
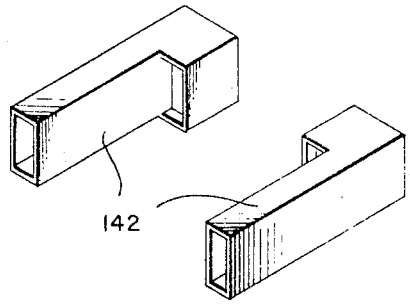
FIG. 17
FIG. 18
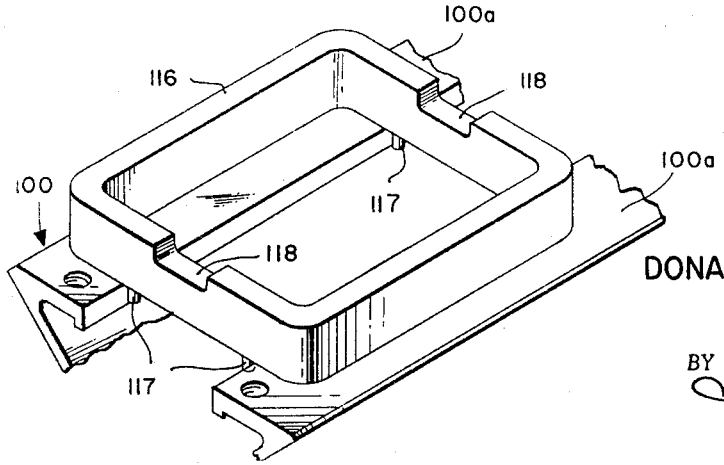
DONALD B. ROTTLER
INVENTOR.
BY Seed & Berry
ATTORNEYS United States Patent Office 3,273,423
Patented Sept. 20, 1966

3,273,423
BORING MACHINE
Donald B. Rottler, 1221 Poplar Place, Seattle, Wash.
Original application May 27, 1963, Ser. No. 283,446.
Divided and this application Dec. 13, 1965, Ser. No. 513,308
10 Claims. (Cl. 77—4)

This application is a division of my co-pending application, Serial No. 283,446, filed May 27, 1963. The present invention relates to an improved vertical-spindle boring machine particularly adapted for the boring of engine cylinders and is of the type in which the workpiece is clamped on a stationary bed and the boring unit is moved on the bed to boring position and then is clamped thereto.

By and large, the original manufacturers of automotive engines use the pan rails of the engine block as a clamping surface to locate the main bearings and the cylinders. One of the objects of the present invention is to provide a boring machine by which the pan rails can also be conveniently used as the reference during the reboring operation to insure that the rebored cylinders will be parallel to one another and perpendicular to the crank shaft.

Another object is to provide an improved boring bar assembly having centering fingers below the cutter which can be easily retracted from above and the cutter used without need of first withdrawing the boring bar.

The invention further aims to provide an improved boring bar of the vertical cantilevered type having dampening means preventing chattering or undue vibration from action of the cutter.

An important object of the invention is to provide an air support system whereby the boring unit can be easily moved and adjusted at will on the stationary bed, particularly during operation of the centering fingers, and to provide an improved power clamping arrangement for selectively clamping the boring unit to the bed and maintaining a continuous equal clamping pressure.

Other more particular objects and advantages of the invention will, with the foregoing, appear and be understood in the course of the following description and claims, the invention consisting in the novel construction and in the adaptation and combination of parts herein after described and claimed.

In the accompanying drawings:

FIG. 2 is an enlarged fragmentary transverse vertical sectional view taken generally as indicated by line 2—2 of FIG. 1.

FIG. 3 is a horizontal sectional view taken along the line 3—3 of FIG. 2.

FIG. 4 is a fragmentary longitudinal vertical sectional view taken as indicated by line 4—4 of FIG. 2.

FIG. 5 is a detail view of the lifting groove shown in smaller scale in FIG. 2.

FIG. 6 is an enlarged fragmentary vertical sectional view taken generally as indicated by line 6—6 in FIG. 1 and with the centering fingers expanded.

FIG. 7 is a detail vertical sectional view taken on line 7—7 of FIG. 10.

Figure 1:
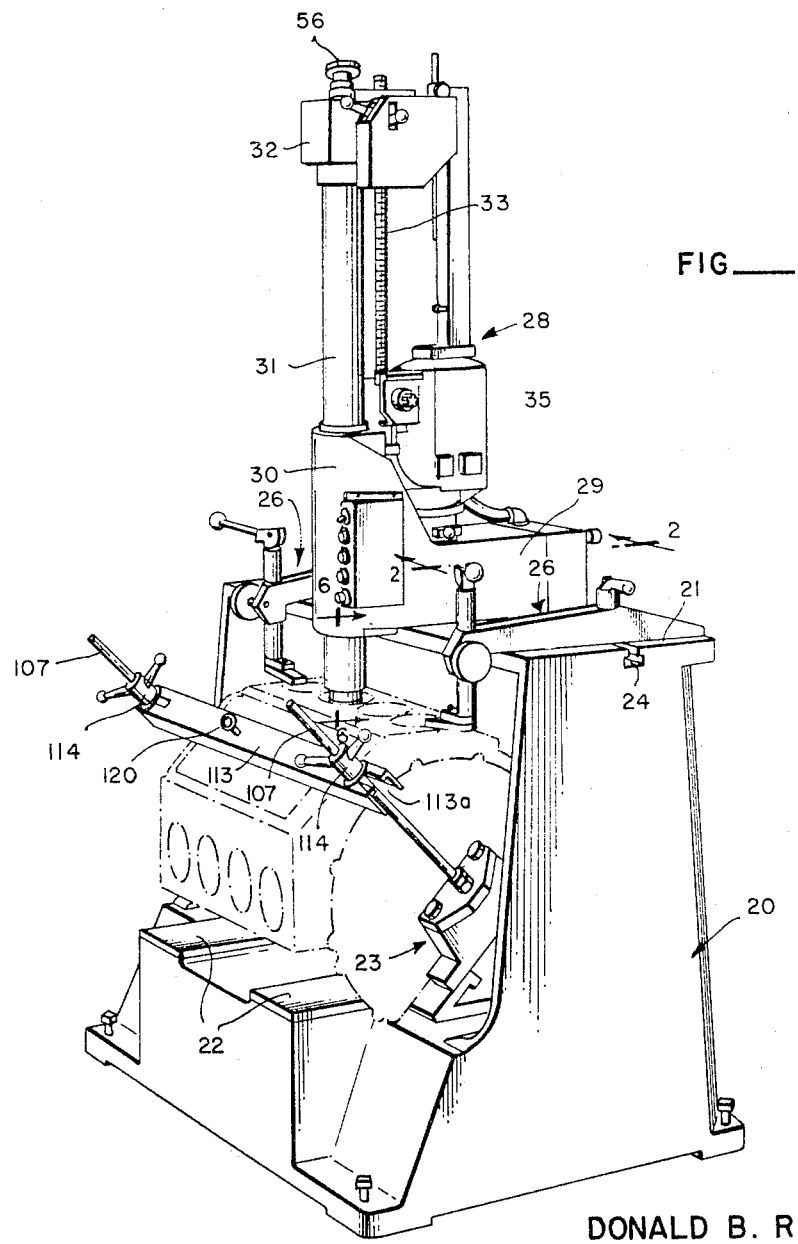
FIG. 1 is a perspective view of a boring machine embodying the present invention.

FIGS. 8, 9 and 10 are horizontal sectional views taken along the lines 8—8, 9—9 and 10—10, respectively, of FIG. 6.

FIG. 11 is an enlarged view partly in vertical section of one of the engine block clamping devices.

FIG. 12 is a detail horizontal sectional view taken as indicated by line 12—12 of FIG. 11.

FIGS. 13 and 14 are schematic views illustrating the function of the indexing bar.

FIG. 15 is an end view of my engine-block fixture.

FIG. 16 is a detail vertical sectional view taken along the line 16—16 of FIG. 15.

FIG. 17 is a fragmentary perspective view illustrating the positioning of a spacer on the pallet of the fixture for use with V-blocks; and FIG. 18 is a perspective view of pallets for use with in-line engine blocks.

Referring to the drawings it is seen that the boring machine of the present invention has a stationary bed 20 having an upper planar slide surface 21 which is laterally offset above a table having a pair of wear pads 22 for receiving an engine-block fixture 23. The slide 21 has a longitudinal keyway 24 of inverted-T cross-section for receiving matching anchoring keys 25 depending from a pair of clamping units 26—26 which are provided to lock the engine block relative to the bed 20. Also occupying the keyway 24 is an elongated locking key 27 suspended from a boring unit 28 which is adjustable both lengthwise and laterally on the slideway 21. The base housing 29 for the boring unit presents a reach 30 overlying the table 22 for guiding an upright sleeve 31 which is keyed therein for vertical sliding movement. This sleeve 31 is fixedly surmounted by a driving head 32 containing mechanism for selectively transferring power from the upper end of an upright screw 33, located to the rear of the sleeve, to the upper end of a boring bar 34 which is journaled in the sleeve and extends therebeyond both top and bottom. The housing 29 carries a motor 35 and contains drive mechanism for transfer of power from this motor to the lower end of the screw 33. Feed mechanism is located in the head 32 for selectively moving the head, sleeve and boring bar vertically relative to the work.

Directing attention to FIGS. 6–10 the sleeve 31 is accurately journaled relative to the housing 29 at the ends of the reach 30 as by tapered bushings 37 which are held in annular end caps 38 by screw rings 40. Felt sealing washers 41 held by retainers 42 may be provided. The sleeve 31 has suitable bearings for the boring bar 34 including an internally tapered thrust bushing 43 at the bottom which is provided with a seal 40 and is mated to a tapered bar portion 34a which joins a base crown 34b. Mounted on the latter is a boring head 45 containing a holder 46 for a cutter 47 and having a bottom cavity 48 for receiving and centering a disc-like counterweight 50. The cavity 48 is closed by a two-piece case 51 which holds upper and lower pairs 53—53 and 54—54, respectively, of centering fingers with the upper fingers at right angles relative to the lower fingers.

It will be noted that the boring bar 34 is tubular to receive a coaxial shaft 55 for operating the centering fingers. This shaft 55 projects above the head 32 to receive a manual adjusting knob 56 and at its lower end has a fitting 57 which is splined to a stub shaft 58. The latter depends freely through the center of a cross-wall 60 in the boring head 45, and through the counterweight 50, and the end walls of the case 51 to receive upper and lower pinions 61–62. These pinions are located in joining center cavities 63–64 formed in the two halves 51a–51b of the case 51 and mesh with racks formed on the opposed faces of the shanks of the centering fingers so that the fingers 53—53 mesh at diametrically opposite points on the pinion 61 while the fingers 54—54 mesh in like manner with the pinion 62. To accommodate and guide the centering fingers, respective pairs of chordal grooves 53a and 54a are provided which intersect the center cavities 63–64.

Three anchoring screws 65 extend through the two halves of the case 51, the counterweight 50, and the boring head 45 into the base crown 34b of the boring bar. However, it is important to note that the three openings 50a in the counterweight for the screws 65 are purposely larger in diameter than the screws so that the counterweight is free to oscillate about its center relative to boring head 45. The maximum angular amount of this movement is closely controlled by a sleeve 69 on one of the screws 65 as shown in FIG. 7. This sleeve is press-fitted in the upper wall of the finger case 51 and is smaller by a preset small amount in external diameter than the diameter of the related hole 50a in the counterweight 50. The resulting limited angular oscillation of the counterweight relative to the boring head dampens and eliminates objectionable vibration and chattering which would otherwise arise from action of the cutter 47 during the boring operation.

As shown in FIGS. 6 and 8 the boring head 45 also has a round upper cavity 66 which is intersected by a radial slot 66a for passage of the holder 46. The cutter 47 is received in an endwise bore in the holder 46 and is locked therein by a set screw 67 while the holder in turn is held by a transverse set screw 68. At its inner end the holder seats against an indexing screw 70 and engages a leaf spring 71 on the under side. This spring is housed in an upwardly exposed slot 72 formed in the wall 60 at a slight cross-angle relative to the holder 46, and it will be noted that the slot 72 has a step 72a at its end portion remote from the set screw 70 on which the root end of the spring 71 rests so that the cantilevered end of the spring can flex downwardly. This cantilevered end has a double tapered lug 71a on its upper side which cooperates with a like shaped transverse groove 46a formed in a horizontally narrowed tail portion 46b of the holder to resist outward endwise movement of the holder while being set. The tip of the tail 46b is beveled top and bottom and on the side facing oppositely from the set screw 68 and the resulting point is engaged by the indexing screw 70. With this arrangement the cutter can be very finely adjusted by use of the screw 70 and the adjustment held by the spring 71 until the screw 68 is tightened. The setting of the screw 70 is held by a lock screw 73.

Viewing FIGS. 2–4, the base of the housing 29 for the boring unit 28 has a slot 74 therethrough traversing the keyway 24 in the top surface 21 of the bed 20. Riding in the slot 74 and surmounting the locking key 27 is a block 75 through which a pull bolt 76 passes from the locking key. This pull bolt has a lock nut 77 bearing on the top of the block 75 and the latter has a set screw 78. At its upper end the pull bolt 76 passes through a slot 80 in a lever plate 81 to receive a head nut 82 which bears against the rim 80a of the slot. The lever plate 81 is pivoted at its rear end by fulcrum dowels 82 on the top of a back stub wall 83 and has top diverging side ribs 81a which gradually vertically thicken to the front of the lever plate and have a pair of lateral ears 84. These ears bear against the top of a pair of lever arms 85 which are fulcrumed on an intermediate stub wall 86 and extend rearwardly to make pin connections 87 with the piston rods 88 of a pair of pneumatic lifting cylinder units 90 which are anchored to the base of the housing 29. Since the ears 84 are adjacent the front fulcrum ends of the lever arms 85 the force exerted by the hydraulic cylinders 90 on the rear ends of the lever arms is multipled several times to the forward end of the lever plate 81. This force is further multiplied by the lever plate on the nut 82 of the pull bolt 76 and results in a concentrated force being exerted by the locking key 27 against the upper shoulders 24a of the keyway 24. In this manner selective loading of the lifting cylinder units 90 firmly locks the boring unit 28 to the bed 20 at the desired position.

The ends of the upright leg of the T-shaped locking key 27 are cut back to accommodate a pair of sleeve rollers 91 which are journaled on stepped pins 92 upstanding from the base of the key. These rollers contact the side walls of the upper necked portion of the keyway 24 for aiding ease of movement of the boring unit 28 lengthwise of the keyway when the lifting cylinders 90 are deactivated. Such ease of movement is aided materially by providing compressed air lifting. To accomplish this a shallow groove 93 (FIG. 5) preferably closed at its ends, is formed along the underside of the housing 29 in parallel relation to the keyway 24 and approximately directly beneath the center of balance of the boring unit 28. This groove 93 has a supply port 93a and is selectively provided with high pressure air through a line 94 connecting to the port by a fitting 94a. When the groove 93 is charged with compressed air the resulting lift exerted on the boring unit makes it easy to move it manually along the keyway 24 or transverse thereto. In the latter instance the lever plate 81 moves relative to the pull bolt 76 by way of the slot 80, the lever plate being held by the fulcrum dowels 82. Continuing to the fixture 23, such is for use with V-blocks or Y-blocks, and therefore its pallet 100 is formed with a pair of longitudinal rails 100a—100a and 100b–100c which are at right angles to one another. A pair of end blocks 101 surmount the ends of the pallet, each having a pair of mounting feet 101a bolted at 102 to the rails 100a. At their upper edge the end blocks 101 have a pair of centered rectangular cutouts 103 arranged to receive a mating indexing bar 104 with its longitudinal edges parallel to the pallet surfaces 100a, 100b and 100c. These cutouts 103 are closed at the top by head plates 105 bolted at 106 to the end blocks. It will be noted that each of the head plates juts outwardly and has a vertical bore 105a with a bottom counter-bore 105b to receive a threaded clamping rod 107 having a nut 108 pinned at its lower end. The upper face of each of these nuts 108 has multiple radial grooves 108a to interfit with a dowel 110 depending from the floor of the related counter-bore 105a to prevent rotation of the respective clamping rod 107. Each of the rods 107 also has a pair of jam nuts 111–112 which are spaced sufficiently above the respective bottom nut 108 to permit the rods 101 to be tilted from the vertical when not under tension so that their upper ends can be swung into and out of end slots 113a in the web of a hold-down bar 113 of channel stock. This bar is clamped by a pair of wing nuts 114 on the rods 107.

Preparatory to mounting an engine block on the pallet the pallet is placed in a suitable cradle to hold it such that the pallet rails are generally horizontal. Then before clamping the engine block against the pallet rails 100a it is properly positioned with respect to the pallet by use of the indexing bar 104 as illustrated in FIGS. 13–14 wherein numeral 115 indicates one of the main bearings of the engine block. With the engine block generally centered on the pallet the indexing bar is threaded through the end openings 103 of the pallet and the main bearings openings. Then the engine block is shifted laterally until the rims of all of the bearings engage an upper chamfered edge 104a of the indexing bar. When this is accomplished the hold-down bar 113 is clamped in position. In this manner parallelism between the cylinder banks of the clamped engine block and the pallet base surfaces 100b–100c is insured.

When Y-blocks are mounted on the fixture 23 their pan rails are seated directly on the rails 100a of the pallet 100. However when V-blocks are mounted a spacer 116 is used between the pan rails and the pallet rails. As shown in FIG. 17 this spacer has locating pins 117 for lateral centering and is positioned between the end blocks 101. It also has upper cutouts 118 registering with the cutouts 103 for receiving the bar 104.

The hold-down bar 113 is provided with a lifting eye 120 so that the palleted engine block can be conveniently hoisted onto the bed 20 with a selected one of the pallet base surfaces 100b and 100c seated on the wear plates 22 and the block alined parallel to the keyway 24. Then the engine block is clamped relative to the bed 20 by use of the clamping units 26.

The key 25 of each of the clamping units is fixed at the lower end of a clamping screw 121 which extends upwardly through a cantilevering beam 122 having a machined bottom surface portion 122a for seating against the top of the bed 20. To button down the beam, pressure is manually applied by use of a handled nut 123 having a lock nut 124. A vertical boss 125 is formed at the forward reaching end of the beam 122 to slidably receive a sleeve 126 having a front foot 127. The boss 125 has a horizontal front bore 125b partially intersecting the vertical bore 125a for the sleeve 126. Slidable in this front bore 125b are a pair of opposed wedges 128–129 comprising cylinders with beveled wedging faces 128a–129a. Wedge 128 is threaded on a lightening screw 130 passing through the front bore 125b and having a manual turning knob 131 at one end. The other wedge 129 is sleeved on the screw 130 and bears by its larger end against a stop shoulder 130a. With this arrangement turning of the knob 131 draws the wedging faces 128a–129a against the sleeve 126 and locks it against endwise movement relative to the beam 122.

Slidable within the sleeve 126 is a rod 132 having a pivot ring 133 pinned at its lower end. At its upper end the rod has a forked cam 134 straddling a flat-sided neck portion 132a at the top of the rod and pivoted thereon by a pin 135. The cam 134 is operated by a handle 136 which when pulled down, causes the cam to bear against a washer 137 and pull up on the rod 132. This causes the ring 133 to draw on the heel of a clamping foot 138 having a counterbore in which the ring is seated, and this action in turn downwardly pivots the toe of the foot about an inverted fulcrum bolt 140. This bolt has its head received in a bottom counterbore in the clamping foot and passes upwardly at a slope through an oversized bore adjacent the outer end of the sleeve foot 127. Jam nuts 141 retain the bolt 140 while permitting the required play between the feet 127 and 138.

In using the clamping units 26 the sleeves 132 are initially set so that the heels of the feet 138 are at approximately the level of the top of the engine block to be secured on the bed. Then it is only necessary to pull down on the handles 136 to perfect the clamping action.

Reviewing the operation of the boring machine, the engine block to be rebored is clamped on one of the fixtures 23 and is lifted onto the wear plates 22. Then, after the fixture is lined up the engine block is clamped to the bed 20 by the clamps 26. An air valve (not shown) is then opened to supply compressed air to the groove 93 exerting a lift on the boring unit 28 which can then be easily moved to position the boring head over the first cylinder. Following this the boring head is lowered into the cylinder bore and the two pairs of centering fingers 53—53 and 54—54 are expanded by turning the knob 56. Final adjustment is then made on the boring unit 28 relative to the bed 20 to obtain bore contact by all of the centering fingers. The air supply to the groove 93 is then shut off and an air valve (not shown) is opened to supply the cylinders 90—90 to power clamp the boring unit 28 against the bed 20. After the centering fingers have been retracted by use of the knob 56, the machine is ready for commencement of the reboring operation. After one bank of cylinders has been rebored the clamps 26 are released, the fixture 23 is turned ninety degrees to move from one of the base faces 100b–100c to the other, and the operation is repeated on the other bank. The boring machine of the present invention is not limited for use in reboring Y-block or V-block engines. For in-line engines a pair of L-shaped pallets 142 (FIG. 18) are used between the engine block and the wear plates 22. And, of course, the boring machine of the present invention can be used for many other machining purposes than the reboring of engine cylinders.

It is believed that the invention will have been clearly understood from the foregoing detailed description of my now-preferred illustrated embodiments. Changes in the details of construction may be resorted to without departing from the spirit of the invention and it is accordingly my invention that no limitations be implied and that the hereto annexed claims be given the broadest interpretation to which the employed language fairly admits.

What I claim is:

1. In combination, a bed, a boring unit supported by said bed and presenting a depending boring bar with a boring head at its lower end, centering finger means having centering fingers on said boring head arranged to be extended and retracted in unison, air lifting means for selectively floating the boring unit relative to said bed while said centering fingers are being extended to center said boring head, and clamping means for clamping the boring unit on said bed after the boring head has been centered.

2. The combination of claim 1 in which said bed has upper and lower laterally offset parallel planar surfaces, said upper surface being interrupted by a locking keyway which is wider at the bottom than at the top, a pair of clamping means overhanging said lower surface for holding down work carried on said lower surface, each of said clamping means including a respective anchoring key in said keyway, said boring unit being movable on said upper surface between said pair of clamping means with said boring bar overhanging said lower surface, and further clamping means engaging said boring unit and including an anchoring key in said keyway for selectively clamping said boring unit against said upper surface.

3. In combination with the boring machine of claim 2, an engine block fixture seated on said lower surface and having an upper sloped surface for receiving the pan rails of an engine block, and hold-down means mounted on said fixture for holding an engine block on said sloped surface.

4. In combination with the boring machine of claim 2, a lifting groove formed in the underside of said boring unit and overlying said upper surface, and means for selectively supplying compressed gas to said groove for applying a lifting force to said boring unit to ease moving of said boring unit relative to said upper surface when said further clamping means is released.

5. The combination of claim 4 in which said lifting groove is parallel to said keyway and is approximately directly beneath the center of gravity of said boring unit.

6. The combination of claim 2 in which said further clamping means compresses fluid pressure cylinder means mounted on said boring unit, and force multiplying means operatively interconnecting said cylinder means and the last mentioned anchoring key whereby fluid pressure applied to said cylinder means power pulls said boring unit toward said upper surface.

7. In combination with the boring machine of claim 1, an engine block fixture seated on said lower surface and having an upper sloped surface for receiving the pan rails of an engine block, the plane of said sloped surface intersecting the plane of said lower surface along a dihedral vertex parallel to said keyway, and an indexing bar slidable through said fixture along a given guide path parallel to said vertex for lining the main bearings of said engine block parallel to said vertex.

8. The combination of claim 1 in which said bed has a planar surface on which said boring unit is movable, a lifting groove formed in the underside of said boring unit and overlying said planar surface, said air lifting means comprising means for selectively supplying compressed gas to said groove for applying a lifting force to said boring unit to ease moving thereof relative to said planar surface when said clamping means is released.

9. The combination of claim 1 in which said bed has a planar surface interrupted by a keyway wider at the bottom than at the top, an anchoring key slidably mounted in said keyway and having a pull rod projecting into said boring unit, overlapping lever means generally paralleling said surface and having opposite ends pivoted on said unit, the lever means furthest from said surface being operatively associated with the projecting end of said pull rod for tensioning the rod responsive to swinging of such lever means away from said surface, fluid cylinder lifting means anchored to said unit and pivotally interconnected with the overlapped end of the lever means closest to said surface for selectively power swinging it away from said surface to responsively swing the other lever means away from said surface and thereby tension said pull rod with a multiplied force and press said unit against said surface by the resulting reaction on the pivoted opposite ends of said lever means.

10. The structure of claim 9 in which the lever means furthest from said surface comprises a lever plate with a center slot transverse relative to said keyway and receiving the projecting end of said pull rod therethrough, a crown on said pull rod for bearing against the rim of said slot the side thereof faced away from said surface, said lever plate having a pair of oppositely projecting ears adjacent its swinging end and alined parallel to said keyway, and the lever means closest to said surface comprising a pair of swing arms at opposite sides of said pull rod and engaging the side of said ears facing said surface.

No references cited.

WILLIAM W. DYER, JR., *Primary Examiner.*

G. A. DOST, *Assistant Examiner.*